United States Patent [19]

Pairon

[11] Patent Number: 4,464,201

[45] Date of Patent: Aug. 7, 1984

[54] PROCESS FOR PRODUCING CEMENT AND CEMENT OBTAINED BY MEANS OF THIS PROCESS

[75] Inventor: Guy S. Pairon, Auderghem, Belgium

[73] Assignee: S.A. Cimenteries C.B.R. Cementbedrijven N.V., Watermael-Boitsfort, Belgium

[21] Appl. No.: 447,937

[22] Filed: Dec. 8, 1982

[30] Foreign Application Priority Data

Dec. 10, 1981 [BE] Belgium .................................. 206801

[51] Int. Cl.$^3$ ........................... C04B 7/35; C04B 7/52
[52] U.S. Cl. .................................. 106/90; 106/102
[58] Field of Search ............................ 106/102, 90

[56] References Cited

U.S. PATENT DOCUMENTS

| | | | |
|---|---|---|---|
| 1,728,496 | 9/1929 | Lindhard | 106/102 |
| 3,689,296 | 9/1972 | Landry | 106/102 |
| 3,856,542 | 12/1974 | Aignesberger et al. | 106/102 |
| 4,204,877 | 5/1980 | Moorer et al. | 106/102 |

FOREIGN PATENT DOCUMENTS

330062  4/1973  Austria .................................. 106/102

*Primary Examiner*—James Poer
*Attorney, Agent, or Firm*—Cushman, Darby & Cushman

[57] ABSTRACT

A process for producing cement to be used when preparing an injection grout for prestressed concrete sheathes, comprising grinding together, at a temperature lower than 90° C., Portland clinker which is free from any corrosive ions for steel, gypsum, an anhydrous water reducing additive and an also anhydrous cement set retarding agent, as well as cement obtained by means of this process and injection grout for prestressed concrete sheathes such as produced with this cement.

9 Claims, No Drawings

PROCESS FOR PRODUCING CEMENT AND CEMENT OBTAINED BY MEANS OF THIS PROCESS

This invention relates to a process for producing cement to be used when preparing an injection grout for prestressed concrete sheathes.

For preparing injection grouts for prestressed concrete sheathes, the up to now used process has consisted of mixing cement, a water reducing additive, a set retarding agent and water on the site.

Due to the fact that such grouts must meet very severe requirements, in particular concerning viscosity, maintaining the latter as a function of temperature variations, setting time, absence of sweating and the like, it is clear that the known process has the important drawback of leaving the workers on the site to dose various grout components; these workers, on the one hand, do not have apparatus allowing to obtain a precise proportioning and, on the other hand, they very often work under such conditions that any precise proportioning is substantially impossible to carry out. This known process has also the drawback of necessitating working sites to be supplied with various components and the latter to be stored.

This invention has for its object to remedy these drawbacks and to provide a process for producing a cement to be used when preparing injection grouts for prestressed concrete sheathes, which cement is ready to be used and to which it is sufficient to add water needed for obtaining the grout, which presents the advantage of definitely eliminating any error or inaccuracy in proportioning said components and of preventing any defects resulting from said proportioning errors or inaccuracies.

To this end, the process according to the invention comprises grinding together, at a temperature lower than 90° C., Portland clinker which is free from any corrosive ions for steel, gypsum, an anhydrous water reducing additive and an also anhydrous cement set retarding agent.

This invention also concerns cement obtained by means of the above-mentioned process, and grout prepared with this cement.

Other details and features of the invention will become apparent from the description of said process given hereinafter by way of a non-limitative example.

In order to obtain a cement ready to be used, allowing through a simple water addition to obtain an injection grout for prestressed concrete sheathes, having a determined viscosity, with this viscosity being retained for a determined time whatever the grout temperature may be between 0° and 30° C., without sweating, with a setting time lower than 24 hours and independent from the temperature, a compressive strength higher than 30 N/mm$^2$, a bending strength higher than 4 N/mm$^2$, a capillar absorption of water lower than 100 g/dm$^2$, a shrinkage lower than 2,8 mm/m and without any agressive agents in regard to reinforcement steel, this process according to the invention comprises mixing together Portland cement, gypsum, an anhydrous water reducing additive and an anhydrous set retarding agent. According to this process, the grinding temperature is maintained lower than 90° C. in order to prevent gypsum (CaSO$_4$.2H$_2$O) to be transformed into hemihydrate (CaSO$_4$.1/2H$_2$O) which could promote false settings of the grout, namely a hardening or a disturbance in the rheology of the cement-water slurry. The grout being intended to coat steel reinforcements of the prestressing sheathes, clinker used in the mixture to be ground must be free from corrosive ions, such as Cl$^-$. Although some grey clinkers are suitable, it is much preferred to use, in order to get an absolute reliability of the cement, a white Portland clinker which can only be obtained, to be pure, from raw materials and fuels which are free from corrosive ions.

The gypsum content in said mixture, expressed as SO$_3$, is higher than 3% by weight so as to prevent a too quick hydration of (CaO)$_3$Al$_2$O$_3$(tricalcium aluminate) in the presence of organic material contained in the cement. As a matter of fact, the presence of organic material in cement can accelerate consumption of SO$_4$ ions issuing from gypsum and dissolved in water. If the gypsum content would be too low, namely SO$_3$<3%, there would be a imbalance between consumption rate of SO$_4^{--}$ ions and dissolution rate of said ions. In other words, there would be a loss of available SO$_4^{--}$ ions in the aqueous medium and a hydration of (CaO)$_3$Al$_2$O$_3$, which would entail a perturbance in the rheology of the cement-water mixture and would cause a workability loss of the injection grout. As water reducing additive present in said mixture, melamine-formaldehyde may be used and as set retarding agent, one may employ glucono-delta-lactone. Both said additives must absolutely be incorporated in the mixture as an anhydrous form, it being given that the grinding is made at a temperature lower than 90° C. and that at such a temperature, it is excluded to enter into the grinder an even very small amount of water which could not be changed into steam to be discharged with hot air. The melamine-formaldehyde and glucono-delta-lactone contents of the mixture are comprised between 0.1–1% and 0.01–0.1% by weight respectively.

It has to be understood that the invention is in no way limited to the process such as described and that many changes can be brought therein without departing from the scope of the present patent.

I claim:

1. A process for producing cement adapted for use in preparing an injection grout for prestressed concrete sheathes, said process comprising grinding together, at a temperature lower than 90° C., Portland clinker which is free from any corrosive ions for steel, gypsum, an anhydrous water reducing additive and an also an anhydrous cement set retarding agent.

2. A process as claimed in claim 1, wherein used clinker is a white Portland clinker the corrosive ions of which, are lower than 0.05%.

3. A process as claimed in claim 1, wherein the gypsum content of the mixture, expressed as SO$_3$, is higher than 3% by weight.

4. A process as claimed in claim 1, wherein the said water reducing additive is melamine-formaldehyde, the reducing additive content of the mixture being 0.1 to 1% by weight.

5. A process as claimed in claim 1, wherein said set retarding agent is glucono-delta-lactone, the retarding agent content of the mixture being 0.01 to 0.1% by weight.

6. An injection grout for prestressed concrete sheathes, prepared from a cement obtained by means of a process comprising grinding together, at a temperature lower than 90° C., Portland clinker which is free from any corrosive ions for steel, gypsum, an anhydrous water reducing additive and an also anhydrous cement set retarding agent.

7. An injection grout adapted for use in prestressed concrete sheathes and when mixed with water having:
a predetermined viscosity that remains substantially the same throughout the temperature range of 0° to 30° C.,
does not sweat,
sets in at least 24 hours independent of the temperature at which the grout is set,
has a compressive strength when set of at least 30 N/mm$^2$,
has a bending strength when set greater than 4 N/mm$^2$,
has a capillar absorption of water below 100 g/dm$^2$,
has a shrinkage less than 2.8 mm/m and being substantially completely free of agents aggressive to reinforcement steel, said grout prepared by mixing and grinding together, at a temperature below 90° C.,
Portland clinker virtually free from ions corrosive to steel,
gypsum,
an anhydrous water-reducing additive, and
an anhydrous cement set-retarding agent.

8. An injection grout of claim 6 to which water has been added.

9. A cement produced by the process of claim 1.

* * * * *